(12) United States Patent
Donovan et al.

(10) Patent No.: US 6,298,656 B1
(45) Date of Patent: Oct. 9, 2001

(54) COMPRESSED AIR STEAM GENERATOR FOR COOLING COMBUSTION TURBINE TRANSITION SECTION

(75) Inventors: Jon Peter Donovan, Tampa; Michael Todd McManus, Oviedo, both of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/677,043

(22) Filed: Sep. 29, 2000

(51) Int. Cl.[7] .................................. F02C 6/18; F02C 7/16
(52) U.S. Cl. ...................... 60/39.182; 60/39.55; 60/39.75
(58) Field of Search .............................. 60/39.07, 39.182, 60/39.53, 39.55, 39.75

(56) References Cited

U.S. PATENT DOCUMENTS

| | | |
|---|---|---|
| 4,532,982 | 8/1985 | Nakamura . |
| 4,680,927 | 7/1987 | Cheng . |
| 4,767,259 | 8/1988 | Kurosawa et al. . |
| 5,284,013 | 2/1994 | Keller . |
| 5,329,758 | 7/1994 | Urbach et al. . |
| 5,357,741 | 10/1994 | Talabisco et al. . |
| 5,564,269 | 10/1996 | Briesch . |
| 5,640,840 | 6/1997 | Briesch . |
| 5,689,948 | 11/1997 | Frutschi . |
| 5,697,208 | 12/1997 | Glezer et al. . |
| 5,724,806 | 3/1998 | Horner . |
| 5,743,080 | 4/1998 | Ginter . |
| 5,826,430 | * 10/1998 | Little ................................. 60/39.75 |
| 6,085,514 | * 7/2000 | Benim et al. ...................... 60/39.55 |
| 6,109,019 | * 8/2000 | Sugishita ......................... 60/39.182 |
| 6,116,018 | * 9/2000 | Tanimura et al. .................. 60/39.75 |

\* cited by examiner

*Primary Examiner*—Louis J. Casaregola

(57) ABSTRACT

A cooling system for a combustion turbine transition section. The combustion turbine includes a compressor assembly with a compressed air bleed line, a combustor assembly, a transition section with integral cooling channels, a turbine assembly with integral cooling channels. The compressor assembly is coupled to the combustor assembly, the combustor assembly is further coupled to the transition section, the transition section is further coupled to the turbine assembly. The compressor assembly, combustor assembly, transition section, and turbine assembly form a flow path. The cooling device includes a compressed air steam generator, a feed water source coupled to, and providing water to, the compressed air steam generator, a steam pipe coupled to the transition section cooling channels and the compressed air steam generator. The compressed air bleed line passes through the compressed air steam generator. In operation, the compressor compresses the ambient air thereby raising the ambient air temperature. The majority of the compressed air flows into the combustor assembly where it is mixed with a fuel and ignited. A portion of the hot compressed air is directed to the compressed air steam generator and converts water in the compressed air steam generator into steam. The steam passes through the steam pipe into the transition section cooling channels, thereby cooling the transition section.

12 Claims, 1 Drawing Sheet

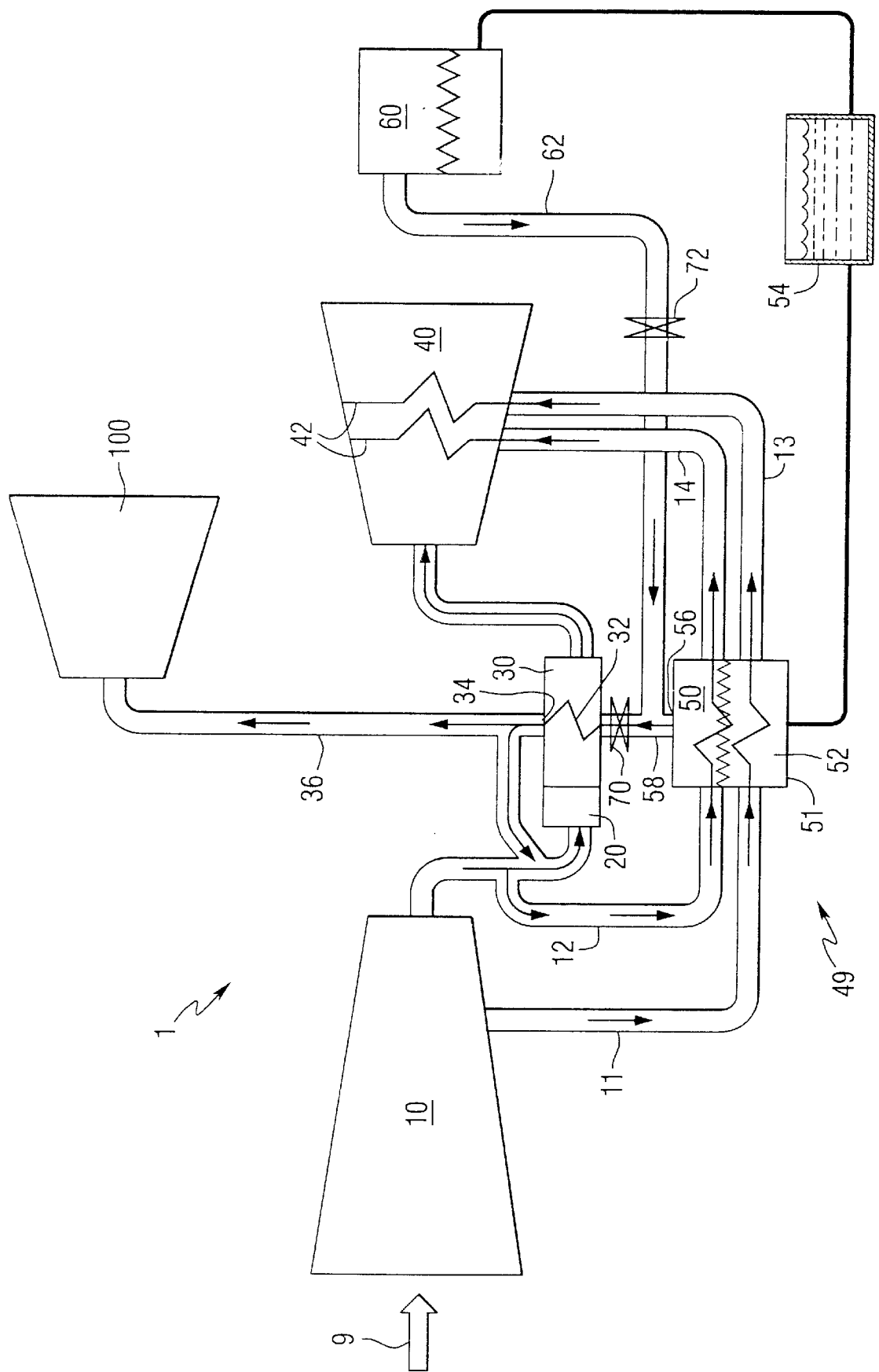

COMPRESSED AIR STEAM GENERATOR FOR COOLING COMBUSTION TURBINE TRANSITION SECTION

BACKGROUND OF THE INVENTION

1. Field of the Invention

This invention relates to a combustion turbine power plant and, more specifically, to a combustion turbine power plant having a compressed air steam generator which is coupled to a transition section between the combustor assembly and turbine assembly of the combustion turbine power plant.

2. Background Information

Combustion turbine power plants, generally, have three main assemblies: a compressor assembly, a combustor assembly, and a turbine assembly. A transition section is located between the combustor assembly and the turbine assembly. In operation, the compressor assembly compresses ambient air. The compressed air is channeled into the combustor assembly where it is mixed with a fuel. The fuel is ignited in the combustor assembly creating a heated working gas. The heated working gas passes through the transition section and into the turbine assembly. Within the transition section, the working gas is typically between 2500–2900° F. (1371–1593° C.). The transition section is heated by the working gas to temperatures near its structural limits. Components subjected to such extreme temperatures may degrade due to thermal stress. Therefore, it is advantageous to provide a cooling system to remove heat from the transition section.

A typical cooling apparatus comprises a heat recovery steam generator located in the exit path from the turbine. The heat recovery steam generator is coupled to a water supply. When the combustion turbine is in operation, heated exhaust gas exits the turbine assembly and passes through the heat recovery steam generator converting water into steam. The steam from the heat recovery steam generator is passed through cooling channels within the casing of the transition section. As the steam passes through the transition section it absorbs heat thereby cooling the transition section. This heated steam may be channeled back into the flow path of the combustion turbine to provide power augmentation or may be channeled to a separate steam turbine.

Because the heat recovery steam generator is located in the exhaust path of the combustion turbine, the heat recovery steam generator may not provide a sufficient amount of steam during the start up cycle to cool the transition section of the combustion turbine. Additionally, combustion turbines which rely on a single heat recovery steam generator have to be shut down to perform maintenance operations on the heat recovery steam generator.

There is, therefore, a need for a steam generator to provide steam to a combustion turbine during the start up cycle of the combustion turbine.

There is a further need for a steam generator which could be used in conjunction with a heat recovery steam generator to provide an alternative source of steam when the heat recovery steam generator is undergoing maintenance.

There is a further need for a steam generator which provides an output of both steam and cooled air which may be used to cool the transition section and the turbine section respectively.

SUMMARY OF THE INVENTION

These needs, and others, are satisfied by the invention which provides a compressed air steam generator which is coupled to the combustion turbine compressor and to a feed water source.

To create steam during the start-up cycle, a compressed air bleed line is coupled to the compressor assembly. The bleed line passes through a steam generator which is also coupled to a feed water source. After the bleed line passes through the steam generator, the bleed line is coupled by a cool air line to the turbine assembly. The steam generator also includes plenum connected to a feed water source and to a steam pipe which is coupled to a series of channels within the transition section. The transition section includes a steam outlet pipe. The steam outlet pipe may be connected to a separate steam turbine or coupled to the flow path of the combustion turbine.

The steam generator is, essentially, a heat exchanger. The compressed air bleed line passes through a quantity of water. The water is contained in a plenum around the compressed air bleed line. The water will absorb heat from the compressed air bleed line and be converted to steam. The plenum is coupled by a steam pipe to the channels within the turbine section. The compressed air circuit and the water/steam circuit are separate; the compressed air and water are not mixed.

In operation, the compressor assembly compresses ambient air, thereby raising the temperature of the compressed air to a temperature of 600° F. (315° C.) or more. The majority of the compressed air is channeled into the combustor assembly. A portion of the compressed air, however, is channeled through the bleed line through the inner plenum in the steam generator. Feed water from the feed water source is channeled into the inner plenum and passes over the compressed air bleed line. Heat from the compressed air is transferred through the bleed line to the feed water thereby converting the feed water to steam and cooling the compressor bleed air. The steam exits the steam generator through the steam pipe, which is coupled to the channels within the walls of the transition section. As the steam passes through the transition section, the transition section transfers heat to the steam thereby lowering the temperature of the walls of the transition section and raising the temperature of the steam. The heated steam exits the transition section further through the outlet pipe and may be directed to the working gas flow path of the combustion turbine or to a separate steam turbine.

The compressed air in the bleed line leaving the steam generator contains cooled compressor air. The cool compressed air travels through a cool air line to channels within the casing of the turbine assembly. The cooled air absorbs heat from the turbine assembly thereby cooling the turbine assembly. The reheated air exits the system through an exhaust and/or is mixed with the working gas in the turbine assembly.

DETAILED BRIEF DESCRIPTION OF THE DRAWINGS

A full understanding of the invention can be gained from the following description of the preferred embodiments when read in conjunction with the accompanying drawing in which:

FIG. 1 is a schematic drawing of a combustion turbine according to the present invention.

DETAILED DESCRIPTION OF THE PREFERRED EMBODIMENT

As shown in FIG. 1, a combustion turbine power plant 1 includes a flow path 9 passing through a compressor assembly 10, a combustor assembly 20, a transition section 30, and a turbine assembly 40. As is well known in the art, the compressor assembly 10 includes a plurality of stationary vanes and rotating blades (not shown). The compressor assembly 10 compresses ambient air and directs the compressed air into the combustor assembly 20. At the downstream end of the compressor assembly 10, the compressed air is at a pressure of about 200–350 p.s.i.a (13.8–24.1 bar) and a temperature of about 750–850° F. (399–454° C.).

As is well known in the art, the combustor assembly 20 includes a fuel injection and ignition system (not shown) which mixes a fuel, such as a combustible gas or fuel oil, with the compressed air. The mixture of fuel and compressed air is ignited, creating a heated working gas. The heated working gas is passed through the transition section 30 to the turbine assembly 40. Both the transition section 30 and the turbine assembly 40 have integral channels 32, 42 (respectively) which allow a cooling fluid to pass therethrough. At the interface between the transition section 30 and the turbine assembly 40, the working gas is at a pressure of about 170–325 p.s.i.a (11.7–22.4 bar) and a temperature of about 2500–2900° F. (1371–1593° C.).

Because the heated working gas is just below its highest temperature as the working gas passes through transition section 30, the transition section 30 is subjected to thermal stress as the transition section 30 absorbs heat from the working gas. To reduce the adverse effects of the thermal stress, the transition section 30 must be cooled. Cooling of the transition section 30 is accomplished by cooling channels 32 which are integral to the transition section 30 structure. The cooling channels 32 are in fluid communication with a steam generator 50 (described below) which provides a cooling steam. The transition section further includes an outlet port 34 which is coupled to the integral channels 32. The outlet port 34 is connected to a steam outlet pipe 36. Steam outlet pipe 36 may be in fluid communication with the flow path 9 or with a separate steam turbine 100. Steam within the outlet pipe 36 is at a pressure of about 500–600 p.s.i.a (34.8–41.2 bar) and a temperature of about 750–1100° F. (399–593° C.).

A transition section cooling device 49 according to the present invention includes a compressed air steam generator 50. The compressed air steam generator 50 includes an outer casing 51 and an inner plenum 52. The inner plenum 52 is coupled to a feed water source 54 and inner plenum 52 is partially filled with feed water. Water drained from the feed water source 54 is at a pressure of about 600–700 p.s.i.a (41.4–48.2 bar) and a temperature of about 40–60° F. (4.4–15.5° C.). The steam generator assembly further includes an outlet port 56 connected to a steam pipe 58. The steam pipe 58 is connected to the transition section cooling channels 32.

At least one compressor bleed air line, and preferably two bleed air lines, 11, 12 extend from the compressor assembly 10 through the compressed air steam generator inner plenum 52 and are coupled to the integral channels of the turbine assembly 42. The compressor air bleed line 11 may be coupled to the flow path at a medial portion of the compressor assembly 10. The medial compressor bleed line transfers compressed air which is at a pressure of about 150–225 p.s.i.a (10.3–15.5 bar) and a temperature of about 600–700° F. (315–371° C.). Alternatively, the compressor air bleed line 12 may be coupled to the flow path at the downstream end of the compressor assembly 10. The compressor end bleed lines transfer air which is at a pressure of about 200–350 p.s.i.a (13.8–24.1 bar) and a temperature of about 750–850° F. (399–454° C.). The compressor air bleed lines 11, 12 extend through the compressed air steam generator 50, but is not in fluid communication therewith. The bleed lines 11, 12 contact the water within the inner plenum 52. Within the inner plenum 52 the compressor air bleed line may include fins or other commonly know devices (not show) to aid in heat transfer. The bleed lines 11, 12 are further coupled by a first and second cool air line 13, 14, respectively, to cooling channels within the turbine assembly 40. As the first cool air line 13 line exits the compressed air steam generator 50, the compressed air is at a pressure of about 135–215 p.s.i.a (93.1–14.8 bar) and a temperature of about 500–600° F. (260–315° C.). As the second cool air line 14 line exits the compressed air steam generator 50, the compressed air is at a pressure of about 180–340 p.s.i.a (12.4–23.4 bar) and a temperature of about 300–500° F. (148–260° C.).

In operation, the compressor assembly 10 compresses the ambient air. A portion of the compressed air passes along the flow path from the compressor assembly 10 into the combustor assembly 20. In the combustor assembly 20, the compressed air is mixed with a fuel. The combined compressed air and fuel are ignited within the combustor assembly 20 creating a working gas. The working gas passes through the transition section 30 and into the turbine assembly 40. A portion of the compressed air from compressor assembly 10 is also passed through the compressor air bleed line 11, 12 through the compressed air steam generator 50. As the compressed air passes through the bleed lines 11, 12 within the steam generator inner plenum 52, water contacts the bleed air lines 11, 12 and is heated until the water is converted into steam. Simultaneously, the compressed air is cooled within the bleed line 11,12. After the compressor bleed air passes through the compressed air steam generator 50, the cooled compressed air travels to the cool air lines 13, 14 into the turbine assembly integral channels 42 where the cooled air absorbs heat from the turbine assembly 40 thereby cooling the turbine assembly 40.

Steam which is created in the compressed air steam generator 50 exits the steam generator 50 through the outlet port 56, passes through the steam pipe 58 into the cooling channels 32 in the walls of the transition section 30. In the transition section 30, the steam absorbs heat from the transition section 30 thereby cooling the transition section 30 and creating super-heated steam. The super-heated steam exits the transition section 30 through the transition section outlet port 34. The super-heated steam which passes through the transition section outlet port 34 may be feed into the combustion turbine flow path, preferably downstream of the compressor bleed air pipe 11, 12, or the super-heated steam may be directed to a separate steam turbine 100.

The combustion turbine assembly 1 may also include a heat recovery steam generator 60 located in the exhaust path of the turbine assembly 1. The heat recovery steam generator 60 is further coupled to a feed water source 54. The heat recovery steam generator 60 is a heat exchanger as is known in the art. The heat recovery steam generator 60 transfers heat from the combustion turbine assembly 1 exhaust into the feed water there by creating steam. The heat recovery steam generator 60 is connected by a secondary pipe 62 to the cooling channels 32 of the transition section 30. Both the steam pipe 58 and the secondary steam pipe 62 may have valves 70, 72 whereby the steam pipe 58 and secondary steam pipe 62 may be closed.

In operation, once the combustion turbine assembly I is at an operating temperature, and the heat recovery steam generator 60 is providing a sufficient quantity of steam, steam may be transferred from the heat recovery steam generator 60 to the pipe 62 coupled to the transition section 30. Thus, the transition section 30 is receiving cooling steam from both the compressed air steam generator 50 and the heat recovery steam generator 60. By using two steam generators 50, 60, either may be shutdown for maintenance while the combustion turbine assembly 1 remains in service. When a steam generator 50, 60 is shutdown, the respective steam pipe 58, 62 will be closed by either valve 70, 72.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A combustion turbine comprising:

a compressor assembly having a compressed air bleed line;

a combustor assembly;

a transition section having integral cooling channels;

a turbine assembly having integral cooling channels;

said compressor assembly coupled to said combustor assembly;

said combustor assembly further coupled to said transition section;

said transition section further coupled to said turbine assembly;

said compressor assembly, combustor assembly, transition section, and turbine assembly form a flow path;

a transition section cooling device comprising:

a compressed air steam generator;

a feed water source coupled to, and providing water to, said compressed air steam generator;

a steam pipe coupled to said transition section cooling channels and said compressed air steam generator;

said compressed air bleed line passing through said compressed air steam generator; and whereby said compressed air steam generator converts water to steam and said steam passes through said steam pipe into said transition section cooling channels.

2. The combustion turbine of claim 1, wherein:

said transition section includes an outlet port coupled to said transition section cooling channels;

said outlet port is further coupled to said combustion turbine flow path; and whereby steam from said steam generator passes through said transition section cooling channels and is fed into said flow path.

3. The combustion turbine of claim 1, wherein:

said transition section includes an outlet port coupled to said transition section cooling channels; and said outlet port is further coupled to a separate steam turbine.

4. The combustion turbine of claim 1, wherein said compressed air bleed line is coupled to said turbine assembly cooling channels.

5. The combustion turbine of claim 4 wherein:

said turbine assembly includes an exhaust region;

said cooling device includes a heat recovery steam generator disposed in said exhaust region; and said heat recovery steam generator is coupled to a feed water source and to said transition section cooling channels.

6. The combustion turbine of claim 5 wherein:

said heat recovery steam generator is coupled to said transition section cooling channels by a secondary steam pipe; and said steam pipe and said secondary steam pipe each having valves whereby either said steam pipe or said secondary steam pipe may be closed.

7. A cooling device for a combustion turbine, said combustion turbine having a compressor assembly with a compressed air bleed line, a combustor assembly, a transition section with integral cooling channels, a turbine assembly with integral cooling channels, said compressor assembly coupled to said combustor assembly, said combustor assembly further coupled to said transition section, said transition section further coupled to said turbine assembly, said compressor assembly, combustor assembly, transition section, and turbine assembly forming a flow path, said cooling device comprising:

a compressed air steam generator;

a feed water source coupled to, and providing water to, said compressed air steam generator;

a steam pipe coupled to said transition section cooling channels and said compressed air steam generator;

said compressed air bleed line passing through said compressed air steam generator; and whereby said compressed air steam generator converts water to steam and said steam passes through said steam pipe into said transition section cooling channels.

8. The cooling device of claim 7, wherein:

said transition section includes an outlet port coupled to said transition section cooling channels;

said outlet port is further coupled to said combustion turbine flow path; and whereby steam from said steam generator passes through said transition section cooling channels and is fed into said flow path.

9. The cooling device of claim 7, wherein:

said transition section includes an outlet port coupled to said transition section cooling channels; and said outlet port is further coupled to a separate steam turbine.

10. The cooling device of claim 7, wherein said compressed air bleed line is coupled to said turbine assembly cooling channels.

11. The cooling device of claim 10 wherein:

said turbine assembly includes an exhaust region and a heat recovery steam generator disposed in said exhaust region; and said heat recovery steam generator coupled to a feed water source and to said transition section cooling channels.

12. The cooling device of claim 11 wherein:

said heat recovery steam generator is coupled to said transition section cooling channels by a secondary steam pipe; and said steam pipe and said secondary steam pipe each having valves whereby either said steam pipe or said secondary steam pipe may be closed.

* * * * *